United States Patent
Usui et al.

(10) Patent No.: US 9,878,315 B2
(45) Date of Patent: *Jan. 30, 2018

(54) ZEOLITE, METHOD FOR MANUFACTURING ZEOLITE, HONEYCOMB CATALYST, AND EXHAUST GAS PURIFYING APPARATUS

(71) Applicant: IBIDEN CO., LTD., Ogaki-shi (JP)

(72) Inventors: Toyohiro Usui, Ibi-gun (JP); Takunari Murakami, Ibi-gun (JP); Hirokazu Igarashi, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 51 days.

This patent is subject to a terminal disclaimer.

(21) Appl. No.: 14/578,495

(22) Filed: Dec. 22, 2014

(65) Prior Publication Data

US 2016/0001277 A1 Jan. 7, 2016

(30) Foreign Application Priority Data

Jul. 7, 2014 (JP) .................................. 2014-139739

(51) Int. Cl.
*B01J 29/76* (2006.01)
*B01J 37/00* (2006.01)
(Continued)

(52) U.S. Cl.
CPC ......... *B01J 29/763* (2013.01); *B01J 29/7015* (2013.01); *B01J 35/002* (2013.01); *B01J 35/04* (2013.01); *B01J 37/0018* (2013.01); *C01B 39/026* (2013.01); *C01B 39/48* (2013.01); *C04B 38/0006* (2013.01); *B01D 2255/50* (2013.01); *B01D 2255/90* (2013.01); *C01P 2002/60* (2013.01); *C01P 2004/62* (2013.01); *C04B 2111/0081* (2013.01); *C04B 2111/00793* (2013.01)

(58) Field of Classification Search
CPC ....................................................... B01J 29/763
See application file for complete search history.

(56) References Cited

U.S. PATENT DOCUMENTS

| | | | | |
|---|---|---|---|---|
| 5,026,532 A | * | 6/1991 | Gaffney | C01B 21/0466 423/705 |
| 2011/0020204 A1 | * | 1/2011 | Bull | B01D 53/9418 423/239.2 |

(Continued)

FOREIGN PATENT DOCUMENTS

| EP | 0391351 | 10/1990 |
|---|---|---|
| EP | 2324920 | 5/2011 |

(Continued)

OTHER PUBLICATIONS

Office Action issued by the United States Patent and Trademark Office for the co-pending U.S. Appl. No. 14/578,493, dated Jan. 31, 2017.

(Continued)

*Primary Examiner* — Douglas B Call
(74) *Attorney, Agent, or Firm* — Mori & Ward, LLP (57) ABSTRACT

A zeolite has a CHA structure, a $SiO_2/Al_2O_3$ composition ratio less than 15, and potassium in an amount of about 0.1% by mass to about 1% by mass in terms of $K_2O$.

10 Claims, 5 Drawing Sheets

(51) Int. Cl.
*B01J 35/04* (2006.01)
*B01J 29/70* (2006.01)
*C01B 39/02* (2006.01)
*C01B 39/48* (2006.01)
*C04B 38/00* (2006.01)
*B01J 35/00* (2006.01)
*C04B 111/00* (2006.01)

(56) References Cited

U.S. PATENT DOCUMENTS

| | | | |
|---|---|---|---|
| 2011/0251048 | A1 | 10/2011 | Ariga et al. |
| 2012/0269719 | A1 | 10/2012 | Moden et al. |
| 2013/0142727 | A1* | 6/2013 | Li .................... B01J 29/88 423/709 |
| 2013/0280160 | A1 | 10/2013 | Ariga et al. |
| 2014/0044635 | A1* | 2/2014 | Ito .................... B01J 35/04 423/239.1 |
| 2014/0127087 | A1 | 5/2014 | Nishio et al. |
| 2015/0078989 | A1* | 3/2015 | Fedeyko ............ B01J 37/031 423/700 |
| 2015/0190791 | A1* | 7/2015 | Fedeyko ......... B01D 53/9418 423/213.2 |

FOREIGN PATENT DOCUMENTS

| | | | |
|---|---|---|---|
| EP | 2505569 | | 10/2012 |
| EP | 2657190 | | 10/2013 |
| EP | 2745935 | | 6/2014 |
| EP | 2746225 | | 6/2014 |
| JP | 2007-296521 | | 11/2007 |
| JP | 2012-508096 | | 4/2012 |
| JP | 2014-515723 | | 7/2014 |
| WO | WO 03/020641 | | 3/2003 |
| WO | WO 2010/054034 | | 5/2010 |
| WO | WO 2010/074040 | | 7/2010 |
| WO | WO 2011/061836 | | 5/2011 |
| WO | WO 2012/086753 | | 6/2012 |
| WO | WO 2012/131917 | | 10/2012 |
| WO | WO2012/132678 | * | 10/2012 |
| WO | WO 2012/145323 | | 10/2012 |
| WO | WO 2013/024547 | | 2/2013 |
| WO | WO 2013/114172 | * | 8/2013 |
| WO | WO2013/155244 | * | 10/2013 |

OTHER PUBLICATIONS

Office Action with Form PTO-892 Notice of References Cited issued by the United States Patent and Trademark Office for the co-pending U.S. Appl. 14/578,493, dated Oct. 18, 2016.

Office Action issued by the United States Patent and Trademark Office for the co-pending U.S. Appl. No. 14/578,493, dated Jun. 30, 2016.

\* cited by examiner

ZEOLITE, METHOD FOR MANUFACTURING ZEOLITE, HONEYCOMB CATALYST, AND EXHAUST GAS PURIFYING APPARATUS

CROSS-REFERENCE TO RELATED APPLICATIONS

The present application claims priority under 35 U. S. C. §119 to Japanese Patent Application No. 2014-139739, filed Jul. 7, 2014. The contents of this application are incorporated herein by reference in their entirety.

BACKGROUND OF THE INVENTION

Field of the Invention

The present invention relates to a zeolite, a method for manufacturing a zeolite, a honeycomb catalyst, and an exhaust gas purifying apparatus.

Discussion of the Background

Conventionally, a SCR (Selective Catalytic Reduction) system in which ammonia reduces NOx to nitrogen and water is known as a system for converting exhaust gases discharged from automobiles. A CHA-structured zeolite (hereafter, also referred to as a CHA zeolite) with copper supported thereon is drawing attentions as a SCR-catalytic zeolite.

The SCR system includes a honeycomb unit having a large number of through holes longitudinally formed in parallel with one another for passing exhaust gases therethrough, as a SCR catalyst carrier. For example, WO 2012/086753 discloses a CHA-structured zeolite having a $SiO_2/Al_2O_3$ composition ratio of less than 15 and a particle size of 1.0 to 8.0 μm with an aim of improving the heat resistance and durability when used as a SCR catalyst carrier.

JP-T 2012-508096 discloses a CHA-structured zeolite having a $SiO_2/Al_2O_3$ composition ratio of less than 15 and an alkali content of less than 3% by mass. In this case, the CHA-structured zeolite coats the surface of a honeycomb unit base material made of another substance, thereby achieving SCR catalysis.

JP-A 2007-296521 discloses a technique in which a zeolite is extrusion-molded together with an inorganic binder and the like into a honeycomb shape in manufacturing of a honeycomb unit to be used as a SCR catalyst.

SUMMARY OF THE INVENTION

According to one aspect of the present invention, a zeolite includes a CHA structure, a $SiO_2/Al_2O_3$ composition ratio less than 15, and potassium in an amount of about 0.1% by mass to about 1% by mass in terms of $K_2O$.

According to another aspect of the present invention, in a method for manufacturing a zeolite, a raw material composition containing a Si source, an Al source, an alkali source, water, and a structure directing agent is reacted to synthesize the zeolite. The zeolite includes a CHA structure, a $SiO_2/Al_2O_3$ composition ratio less than 15, and potassium in an amount of about 0.1% by mass to about 1% by mass in terms of $K_2O$. An amount of the potassium in the zeolite synthesized in the reacting the raw material composition is controlled using at least one of ammonium sulfate, ammonium nitrate, and ammonium chloride.

According to further aspect of the present invention, a honeycomb catalyst includes a honeycomb unit. The honeycomb unit has partition walls extending along a longitudinal direction of the honeycomb unit to define through holes. The honeycomb unit includes an inorganic binder and a zeolite. The zeolite includes a CHA structure, a $SiO_2/Al_2O_3$ composition ratio less than 15, and potassium in an amount of about 0.1% by mass to about 1% by mass in terms of $K_2O$.

According to the other aspect of the present invention, an exhaust gas purifying apparatus includes a honeycomb catalyst. The honeycomb catalyst includes a honeycomb unit. The honeycomb unit has partition walls extending along a longitudinal direction of the honeycomb unit to define through holes. The honeycomb unit includes an inorganic binder and a zeolite. The zeolite includes a CHA structure, a $SiO_2/Al_2O_3$ composition ratio less than 15, and potassium in an amount of about 0.1% by mass to about 1% by mass in terms of $K_2O$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

A zeolite of the embodiment of the present invention is a zeolite having a CHA structure, the zeolite having a $SiO_2/Al_2O_3$ composition ratio of less than 15, the zeolite containing K (potassium) in an amount of 0.1 to 1% by mass in terms of $K_2O$.

If the amount of K contained in the zeolite is large, the function of oxidizing ammonia is enhanced. In such a case, ammonia to be used for reduction of NOx is consumed, resulting in a lowered NOx conversion rate.

In the zeolite of the embodiment of the present invention, however, the amount of K contained in the zeolite is low as 0.1 to 1% by mass in terms of $K_2O$, and therefore, ammonia to be used for reduction of NOx is not oxidized and sufficiently present, leading to a high NOx conversion rate. Especially, since ammonia is sufficiently present even in a high temperature range (around 525° C.) of exhaust gases, the NOx converting performance is excellent.

In the zeolite of the embodiment of the present invention, if the $SiO_2/Al_2O_3$ composition ratio is 15 or more, the NOx conversion rate lowers. The reason for this lowering is that, if the $SiO_2/Al_2O_3$ is high, the amount of Cu, which functions as a catalyst, to be supported is small. If the amount of K contained in the zeolite exceeds 1% by mass in terms of $K_2O$, as mentioned above, the function of oxidizing ammonia is enhanced. In such a case, ammonia to be used for reduction of NOx is consumed, resulting in a lowered NOx conversion rate. If the raw material for zeolite synthesis does not contain a K-containing compound for the purpose of synthesizing a zeolite containing K in an amount of less than 0.1% by mass in terms of $K_2O$, a single phase of CHA is less likely to be achieved and crystallization of the zeolite is not likely to progress. Such a raw material provides poor manufacturing efficiency and is costly. If the amount of K contained in the zeolite is reduced to less than 0.1% by mass in terms of $K_2O$ by treatment after synthesis of the zeolite, the number of ion exchange or the ion-exchange time is increased as K is less likely to be ion-exchanged with Cu. Such a raw material provides poor manufacturing efficiency and is costly.

In the zeolite of the embodiment of the present invention, the zeolite preferably has an average particle size of 0.1 to 0.5 μm.

If the zeolite has a small particle size of 0.1 to 0.5 μm, a honeycomb catalyst made of such zeolite has a small displacement caused by water absorption. Moreover, during manufacturing or use as a catalyst, the honeycomb catalyst is less likely to have cracks and is excellent in heat resistance and durability.

If the zeolite has an average particle size of less than 0.1 μm, a honeycomb catalyst made of such zeolite has too small a pore size, leading to lowered NOx converting performance. In contrast, if the average particle size of the zeolite is more than 0.5 μm, the honeycomb catalyst made of such zeolite has a great displacement caused by water absorption, which possibly causes cracks in the honeycomb catalyst.

In the zeolite of the embodiment of the present invention, the zeolite preferably has a ratio of a total integrated intensity of a (211) plane, a (104) plane, and a (220) plane in an X-ray diffraction spectrum obtained by a powder X-ray diffraction method of 3.1 or more relative to a total integrated intensity of a (111) plane and a (200) plane in an X-ray diffraction spectrum of lithium fluoride.

Having a ratio of a total integrated intensity of a (211) plane, a (104) plane, and a (220) plane in an X-ray diffraction spectrum obtained by a powder X-ray diffraction method of 3.1 or more relative to a total integrated intensity of a (111) plane and a (200) plane in an X-ray diffraction spectrum of lithium fluoride, the zeolite has high crystallinity so that structural change by heat or the like is hardly occur, and is excellent in NOx converting performance, heat resistance, and durability.

If the ratio of a total integrated intensity of a (211) plane, a (104) plane, and a (220) plane in an X-ray diffraction spectrum obtained by a powder X-ray diffraction method is less than 3.1 relative to a total integrated intensity of a (111) plane and a (200) plane in an X-ray diffraction spectrum of lithium fluoride, the crystallinity is low, so that the structure is likely to be changed by heat or the like.

The ratio of a total integrated intensity of a (211) plane, a (104) plane, and a (220) plane in an X-ray diffraction spectrum of a zeolite obtained by a powder X-ray diffraction method relative to a total integrated intensity of a (111) plane and a (200) plane in an X-ray diffraction spectrum of lithium fluoride ([total integrated intensity of a (211) plane, a (104) plane, and a (220) plane of an X-ray diffraction spectrum of zeolite]/[total integrated intensity of a (111) plane and a (200) plane in an X-ray diffraction spectrum of lithium fluoride]) may also be simply referred to as an X-ray integrated intensity ratio.

The X-ray integrated intensity ratio is preferably 3.3 or more and more preferably 3.5 or more.

As the value of the X-ray integrated intensity ratio is higher, the crystallinity of the zeolite is higher. In this case, since the structure is further less likely to be changed by heat or the like, the resulting honeycomb catalyst shows high NOx converting performance and is excellent in the heat resistance and durability.

For obtaining the X-ray integrated intensity ratio, powder for X-ray diffraction (XRD) measurement is prepared as described in the following, and the XRD measurement is performed thereon.

Specifically, 15.0% by mass of lithium fluoride is added to zeolite powder and sufficiently mixed (hereafter, the mixed powder is referred to as a sample). Next, for adjustment of the moisture content, the sample is placed in an airtight polypropylene container in which the humidity is stable for 7 hours or longer in a state where the sample is charged in an XRD measurement folder. The humidity is stabilized by placing a beaker containing a saturated aqueous solution of ammonium sulfate in the airtight polypropylene container until the humidity is stabilized.

Next, the XRD measurement is performed with an X-ray diffractometer (manufactured by Rigaku Corporation, Ultima IV). The measurement conditions are set to radiation source: CuKα (λ=0.154 nm), measurement method: FT method, diffraction angle: 2θ=5 to 48°, step width: 0.02°, integration time: 1 second, divergence slit and scattering slit: 2/3°, longitudinal restriction divergence slit: 10 mm, accelerating voltage: 40 kV, and acceleration current: 40 mA. The weight of the sample is set not to change 0.1% or more before and after the XRD measurement. The resulting XRD data is subjected to peak search with use of JADE 6.0 (powder X-ray diffraction pattern integrated analysis software). In addition, the half-value width and integrated intensity of each peak are calculated. The conditions for peak search are set to filter type: parabola filter, Kα2 peak: eliminated, peak position: peak top, threshold value σ: 3, peak intensity % cut-off: 0.1, range for determining BG: 1, and the number of points for averaging BG: 7. Based on the resulting data, a total integrated intensity of a (211) plane (2θ=around 20.7°), a (104) plane (2θ=around 25.1°), and a (220) plane (2θ=around 26.1°) of the zeolite, and a total integrated intensity of a (111) plane (2θ=around 38.6°), and a (200) plane (2θ=around 45.0°) of lithium fluoride are calculated. Then, the ratio thereof is obtained. The integrated intensities of the peaks of the (211) plane, the (104) plane, and the (220) plane of the zeolite are employed here as influence of water absorption by the sample is small.

In the zeolite of the embodiment of the present invention, copper in an amount of 3.5 to 6.0% by mass of the zeolite is supported on the zeolite.

Supporting 3.5 to 6.0% by mass of copper (Cu), the zeolite in a small amount can provide high NOx converting performance. In a case where the amount of Cu is less than 3.5% by mass, the NOx converting performance is lowered.

If the amount of Cu is more than 6.0% by mass, ammonia oxidation is promoted at high temperatures, lowering the NOx converting performance.

A method for manufacturing a zeolite of the embodiment of the present invention is a method for manufacturing the zeolite described above, the method including the step of: synthesizing the zeolite by reacting a raw material composition containing a Si source, an Al source, an alkali source, water, and a structure directing agent; and controlling the amount of K in the zeolite synthesized in the synthesis step using at least one of ammonium sulfate, ammonium nitrate, and ammonium chloride.

In the method for manufacturing a zeolite of the embodiment of the present invention, in synthesis of the zeolite, the amount of K in the zeolite resulting from the synthesis step is controlled using at least one of ammonium sulfate, ammonium nitrate, and ammonium chloride. As a result, the synthesized zeolite has a low K content.

A honeycomb catalyst of the embodiment of the present invention includes a honeycomb unit having a plurality of through holes longitudinally formed in parallel with one another and a partition wall separating the through holes, wherein the honeycomb unit includes a zeolite and an inorganic binder, and the zeolite is the zeolite of the embodiment of the present invention.

In the honeycomb catalyst of the embodiment of the present invention, the zeolite of the embodiment of the present invention is used. As a result, a honeycomb catalyst including a honeycomb unit exhibiting a high NOx conversion rate is achieved.

In the honeycomb catalyst of the embodiment of the present invention, preferably, the honeycomb unit further contains inorganic particles, and the inorganic particles are at least one selected from the group consisting of alumina, titania, and zirconia.

Adjustment of the particle size of these inorganic particles enables favorable adjustment of the pore size and the like of the partition wall, thereby improving the function as a honeycomb catalyst.

An exhaust gas purifying apparatus of the embodiment of the present invention includes the honeycomb catalyst of the embodiment of the present invention.

The embodiment of the present invention provides an exhaust gas purifying apparatus showing high NOx converting performance and excellent in NOx converting performance especially in a high temperature range of exhaust gases.

The following description specifically but non-limitatively discusses the embodiment of the present invention. The description may be appropriately modified to the extent that would not change the gist of the present invention.

A zeolite of the embodiment of the present invention is a zeolite having a CHA structure, the zeolite having a $SiO_2/Al_2O_3$ composition ratio of less than 15, the zeolite containing K in an amount of 0.1 to 1% by mass in terms of $K_2O$.

The zeolite of the embodiment of the present invention is classified to have a structure code "CHA" determined by International Zeolite Association (IZA) and has a crystal structure equivalent to that of naturally produced chabazite.

The crystal structure of the zeolite is analyzed with an X-ray diffractometer (XRD).

In the X-ray diffraction spectrum of the CHA zeolite by the powder X-ray diffraction method, peaks corresponding to the (211) plane, (104) plane, and (220) plane of a CHA zeolite crystal appear respectively at 2θ=around 20.7°, around 25.1°, and around 26.1°. The crystallinity of the zeolite of the embodiment of the present invention is evaluated based on a ratio (X-ray integrated intensity ratio) of a total integrated intensity of the (211) plane, (104) plane, and (220) plane of the zeolite relative to a total integrated intensity of a peak corresponding to the (111) plane at 2θ=around 38.7° and a peak corresponding to the (200) plane at 2θ=around 44.9° in the X-ray diffraction spectrum of lithium fluoride.

A ratio (X-ray integrated intensity ratio) of a total integrated intensity of the (211) plane, (104) plane, and (220) plane of the zeolite is preferably 3.1 or more relative to a total integrated intensity of the (111) plane and (200) plane in the X-ray diffraction spectrum of lithium fluoride.

The zeolite having an X-ray integrated intensity ratio of 3.1 or more has high crystallinity and is less likely to have its structure changed by heat or the like. Moreover, such zeolite shows high NOx converting performance and is excellent in heat resistance and durability.

The X-ray integrated intensity ratio is obtained as described above.

The $SiO_2/Al_2O_3$ composition ratio of the CHA zeolite refers to a molar ratio (SAR) of $SiO_2$ relative to $Al_2O_3$ in the zeolite. The $SiO_2/Al_2O_3$ composition ratio of the CHA zeolite of the embodiment of the present invention is less than 15, preferably 5 to 14.9, and more preferably 10 to 14.9.

Since the CHA zeolite of the embodiment of the present invention has a $SiO_2/Al_2O_3$ composition ratio of less than 15, the number of acid sites of the zeolite is sufficient. The acid sites enable ion-exchange with metal ions, so that the zeolite can support a large amount of Cu to have excellent NOx converting performance. If the CHA zeolite has a $SiO_2/Al_2O_3$ composition ratio of not less than 15, the amount of supported Cu is small, lowering the NOx conversion rate.

The molar ratio ($SiO_2/Al_2O_3$) of the zeolite can be measured by fluorescence X-ray analysis (XRF).

The amount of K contained in the CHA zeolite of the embodiment of the present invention is 0.1 to 1% by mass in terms of $K_2O$.

If the amount of K contained in the zeolite is large, the function of oxidizing ammonia is enhanced. In such a case, ammonia to be used for reduction of NOx is consumed, resulting in a lowered NOx conversion rate.

In the zeolite of the embodiment of the present invention, however, the amount of K contained in the zeolite is low as 0.1 to 1% by mass in terms of $K_2O$, and therefore, ammonia to be used for reduction of NOx is sufficiently present, leading to a high NOx conversion rate. Especially, since ammonia is sufficiently present even in a high temperature range (around 525° C.) of exhaust gases, the NOx converting performance is excellent.

The amount of K can be measured by fluorescence X-ray analysis (XRF).

The CHA zeolite of the embodiment of the present invention has an average particle size of preferably 0.1 to 0.5 μm and more preferably 0.1 to 0.4 μm. In a case where such zeolite having a small average particle size is used to manufacture a honeycomb catalyst, the displacement caused by water absorption is small.

If the CHA zeolite of the embodiment of the present invention has an average particle size of less than 0.1 μm, a honeycomb catalyst made of such zeolite has too small a pore size, resulting in lowered NOx converting performance. If the CHA zeolite of the embodiment of the present invention has an average particle size of more than 0.5 μm, a honeycomb catalyst made of such zeolite has a great displacement caused by water absorption, which may cause cracks in the honeycomb catalyst.

The average particle size of the zeolite is obtained by taking a SEM photograph of the zeolite with a scanning electron microscope (SEM, manufactured by Hitachi High-Technologies Corporation, S-4800) and averaging the lengths of all diagonal lines of 10 particles. The measurement conditions are set to accelerating voltage: 1 kV, emission: 10 μA, and WD: 2.2 mm or less. Commonly, a CHA zeolite particle is a cube and has a square shape in a two-dimensional SEM photograph. Accordingly, each particle includes two diagonal lines.

In the zeolite of the embodiment of the present invention, Cu in an amount of 3.5 to 6.0% by mass of the zeolite is preferably supported on the zeolite.

Supporting 3.5 to 6.0% by mass of Cu, the zeolite in a small amount can provide high NOx converting performance. In a case where the amount of Cu is less than 3.5% by mass, the NOx converting performance is lowered. If the amount of Cu is more than 6.0% by mass, ammonia oxidation is promoted at high temperatures, lowering the NOx converting performance. The amount of supported Cu can be measured by fluorescence X-ray analysis (XRF).

Cu ion exchange is carried out by immersing the zeolite in an aqueous solution of one selected from copper acetate, copper nitrate, copper sulfate, and copper chloride. Preferred among these is an aqueous solution of copper acetate. The reason for this is that a large amount of Cu can be supported at once. For example, copper is supported on the zeolite by performing ion exchange with an aqueous solution of copper acetate (II) having a copper concentration of 0.1 to 2.5% by mass and a solution temperature of room temperature to 50° C. under atmospheric pressure.

The CHA zeolite of the embodiment of the present invention can be suitably used as a catalyst, adsorbent, ion exchanger, or the like. Among these, a honeycomb catalyst containing the CHA zeolite of the embodiment of the present invention is also encompassed by the embodiment of the present invention.

Next, a description is given on a method for manufacturing a zeolite of the embodiment of the present invention.

The method for manufacturing a zeolite of the embodiment of the present invention is a method for manufacturing the zeolite of the embodiment of the present invention, the method including the step of: synthesizing the zeolite by reacting a raw material composition containing a Si source, an Al source, an alkali source, water, and a structure directing agent; and controlling the amount of K in the zeolite synthesized in the synthesis step using at least one of ammonium sulfate, ammonium nitrate, and ammonium chloride.

In the method for manufacturing a zeolite of the embodiment of the present invention, first, a raw material composition containing a Si source, an Al source, an alkali source, water, and a structure directing agent is prepared.

The Si source refers to a compound, salt or composition that is a raw material of a silicon component in the zeolite.

Examples of the Si source include colloidal silica, amorphous silica, sodium silicate, tetraethyl orthosilicate, and an alumino-silicate gel. Two or more of these may be used in combination. Among these, preferred is colloidal silica as the resulting zeolite has an average particle size of 0.1 to 0.5 μm.

Examples of the Al source include aluminum sulfate, sodium aluminate, aluminum hydroxide, aluminum chloride, an alumino-silicate gel, and a dried aluminum hydroxide gel. Among these, preferred are aluminum hydroxide and a dried aluminum hydroxide gel.

In the method for manufacturing a zeolite of the embodiment of the present invention, for the purpose of manufacturing a target CHA zeolite, the Si source and Al source used preferably have a molar ratio ($SiO_2/Al_2O_3$) similar to that of the aimed zeolite. The molar ratio ($SiO_2/Al_2O_3$) in the raw material composition is preferably 5 to 30 and more preferably 10 to 15.

Examples of the alkali source include sodium hydroxide, potassium hydroxide, rubidium hydroxide, cesium hydroxide, lithium hydroxide, alkali components in aluminate and silicate, and an alkali component in an alumino-silicate gel. Two or more of these may be used in combination. Among these, preferred are potassium hydroxide, sodium hydroxide, and lithium hydroxide. For obtaining a single phase of zeolite, especially preferred is potassium hydroxide.

The amount of water is not particularly limited. A ratio of the mole number of water to the total mole number of Si in the Si source and Al in the Al source (mole number of $H_2O$/total mole number of Si and Al) is preferably 12 to 30, and is more preferably 15 to 25.

The structure directing agent (hereafter, also referred to as SDA) indicates an organic molecule defining the pore size, crystal structure, and the like of the zeolite. In accordance with the kind and the like of the structure directing agent, the structure and the like of the resulting zeolite are controlled.

The structure directing agent may be at least one selected from the group consisting of hydroxides, halides, carbonates, methyl carbonates, sulfates, and nitrates containing N,N,N-trialkyladamantane ammonium as a cation; and hydroxides, halides, carbonates, methyl carbonates, sulfates, and nitrates containing an N,N,N-trimethyl benzyl ammonium ion, an N-alkyl-3-quinuclidinol ion, or N,N,N-trialkyl exoamino norbornane as a cation. Among these, preferred is at least one selected from the group consisting of N,N,N-trimethyl adamantane ammonium hydroxide (hereafter, also referred to as TMAAOH), N,N,N-trimethyl adamantane ammonium halide, N,N,N-trimethyl adamantane ammonium carbonate, N,N,N-trimethyl adamantane ammonium methyl carbonate, and N,N,N-trimethyl adamantane ammonium sulfate. More preferred is TMAAOH.

In the method for manufacturing a zeolite of the embodiment of the present invention, a seed crystal of the zeolite may be further added to the raw material composition. The use of a seed crystal increases the crystallization rate of zeolite, thereby shortening the crystallization time in manufacturing of a zeolite to improve the yield.

The seed crystal of the zeolite is preferably a CHA-structured zeolite.

The amount of the seed crystal of the zeolite is preferably small. In consideration of the reaction speed and the effect of suppressing impurities, the amount is preferably 0.1 to 20% by mass and more preferably 0.5 to 15% by mass relative to the amount of the silica component contained in the raw material composition.

In the method for manufacturing a zeolite of the embodiment of the present invention, the prepared raw material composition is reacted to synthesize a zeolite. Specifically, a zeolite is preferably synthesized by hydrothermal synthesis of the raw material composition.

The reaction vessel used for hydrothermal synthesis is not particularly limited as long as it is usable for conventional hydrothermal synthesis, and may be a heat and pressure-resistant vessel (e.g., autoclave). The raw material composition charged into a reaction vessel is sealed and heated, thereby crystallizing a zeolite.

In synthesis of a zeolite, the raw material mixture may be in a stationary state but is preferably under stirring.

The heating temperature in synthesis of a zeolite is preferably 100 to 200° C. and more preferably 120 to 180° C. If the heating temperature is lower than 100° C., the crystallization rate may be slow, and the yield tends to lower. If the heating temperature is higher than 200° C., impurities tend to be generated.

The heating time in synthesis of a zeolite is preferably 10 to 200 hours. If the heating time is shorter than 10 hours, unreacted raw materials may remain, and the yield tends to lower. If the heating time is longer than 200 hours, the yield or crystallinity is not any more improved.

The pressure applied in synthesis of a zeolite is not particularly limited and may be a pressure generated during heating of the raw material composition in the sealed vessel within the above temperature range. If necessary, an inert gas (e.g., nitrogen gas) may be added to increase the pressure.

In the method for manufacturing a zeolite of the embodiment of the present invention, after synthesis by the above method, the zeolite is preferably sufficiently cooled, solid-liquid separated, washed with an adequate amount of water.

In the next step, the amount of K in the zeolite synthesized in the synthesis step is controlled using at least one of ammonium sulfate, ammonium nitrate, and ammonium chloride.

Specifically, at least one of ammonium sulfate, ammonium nitrate, and ammonium chloride is dissolved in water, and the zeolite is added to the resulting aqueous solution. The mixture is stirred at 4 to 100° C. for 0.1 to 3 hours so that K in the zeolite is substituted with ammonium ions, thereby controlling the amount of K. At this time, in the aqueous solution, the amount of the ammonium ions contained in at least one of ammonium sulfate, ammonium nitrate, and ammonium chloride is preferably 0.5 to 6 mol/L, and the amount of the aqueous solution is preferably 0.5 to 20 g relative to 1 g of the zeolite. In such a case, the amount of K in the zeolite can be controlled to 0.1 to 1% by mass in terms of $K_2O$.

The synthesized zeolite contains the SDA in pores, and it may be removed, if needed. For example, the SDA can be removed by liquid phase treatment using an acidic solution or a liquid chemical containing a SDA-decomposing component, or exchange treatment using a resin or thermal decomposition.

By the above process, a CHA-structured zeolite having a $SiO_2/Al_2O_3$ composition ratio of less than 15 and containing K in an amount of 0.1 to 1% by mass in terms of $K_2O$ can be manufactured.

Next, a description is given on the honeycomb catalyst of the embodiment of the present invention.

The honeycomb catalyst of the embodiment of the present invention is a honeycomb catalyst including a honeycomb unit having a plurality of through holes longitudinally formed in parallel with one another and a partition wall separating the through holes, wherein the honeycomb unit includes a zeolite and an inorganic binder, and the zeolite is the zeolite of the embodiment of the present invention.

Figure 1:
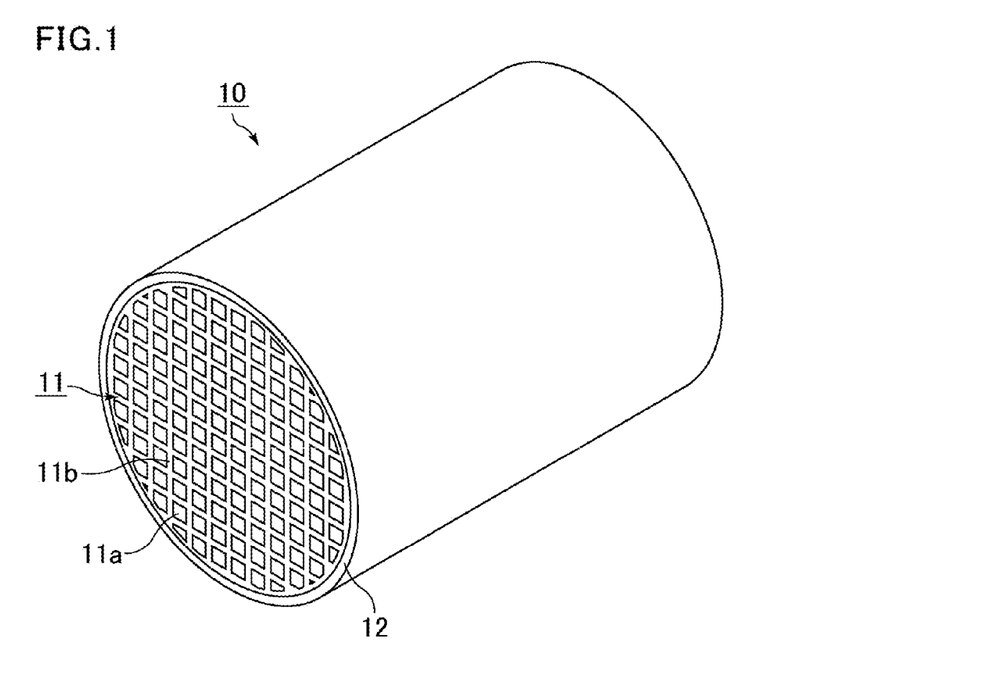
FIG. 1 is a perspective view schematically illustrating one example of a honeycomb catalyst of an embodiment of the present invention.

FIG. 1 shows an example of the honeycomb catalyst of the embodiment of the present invention. A honeycomb catalyst 10 illustrated in FIG. 1 includes a single honeycomb unit 11 including a plurality of through holes 11a longitudinally formed in parallel with one another and a partition wall 11b separating the through holes. On the peripheral surface of the honeycomb unit 11, a peripheral coat layer 12 is formed. The honeycomb unit 11 includes a zeolite and an inorganic binder.

In the honeycomb catalyst of the embodiment of the present invention, a partition wall of a honeycomb unit has a maximum peak pore size (hereafter, also referred to as a maximum peak pore size of a honeycomb unit) of preferably 0.03 to 0.15 μm and more preferably 0.05 to 0.10 μm.

The pore size of the honeycomb unit can be measured by mercury porosimetry. Here, the contact angle of mercury is set to 130° and the surface tension is set to 485 mN/m. Measurement is performed in a pore size range of 0.01 to 100 μm. The value of the pore size at which the pore size reaches the maximum peak within this range is referred to as a maximum peak pore size.

In the honeycomb catalyst of the embodiment of the present invention, the honeycomb unit has a porosity of preferably 40 to 70%. If the porosity of the honeycomb unit is less than 40%, exhaust gases are less likely to permeate inside the partition wall of the honeycomb unit, so that the zeolite is not effectively used in conversion of NOx. If the porosity of the honeycomb unit is more than 70%, the strength of the honeycomb unit is insufficient.

The porosity of the honeycomb unit can be determined by the gravimetric method.

The porosity is measured by the gravimetric method described in the following.

The honeycomb unit is cut into a test sample in a size of 7 cells×7 cells×10 mm. The test sample is subjected to ultrasonic cleaning with ion exchange water and acetone, and then dried in an oven at 100° C. Next, the size of the cross section of the test sample was measured with a measuring microscope (Measuring Microscope MM-40 of 100 magnifications manufactured by Nikon). Based on the measured size, the volume is geometrically calculated. In a case where the volume cannot be geometrically calculated, the image treatment is performed on a cross-sectional photograph, thereby calculating the volume.

Then, based on the calculated volume and the true density of the test sample measured with a pycnometer, the weight is calculated on the assumption that the sample is a complete dense body.

The measurement with pycnometer is performed as follows. The honeycomb unit is powdered to provide 23.6 cc of powder. The resulting powder is dried at 200° C. for eight hours. Then, the true density is measured with Auto Pycnometer 1320 (manufactured by Micromeritics) in conformity with JIS-R-1620 (1995). At this time, the exhaustion time is set to 40 min.

Next, the actual weight of the sample is measured with an electronic valance (manufactured by Shimadzu Corporation, HR202i) and the porosity is calculated by the following formula:

$$100-(\text{Actual weight/Weight as dense body})\times 100(\%).$$

In the honeycomb catalyst of the embodiment of the present invention, the zeolite contained in the honeycomb unit is the above-described CHA-structured zeolite of the embodiment of the present invention having a $SiO_2/Al_2O_3$ composition ratio of less than 15 and containing K in an amount of 0.1 to 1% by mass in terms of $K_2O$.

A detailed description on the zeolite is omitted here as it has been given in the description on the zeolite of the embodiment of the present invention.

The amount of the CHA zeolite in the honeycomb unit is preferably 40 to 90 vol % and more preferably 50 to 80 vol %. If the amount of the CHA zeolite is less than 40 vol %, the NOx converting performance is lowered. If the amount of the CHA zeolite is more than 90 vol %, the strength of the honeycomb unit tends to be lowered as the amount of other components is too small.

In the honeycomb catalyst of the embodiment of the present invention, the honeycomb unit may contain a zeolite other than the CHA zeolite and silicoaluminophosphate (SAPO) to the extent that these would not impair the effects of the embodiment of the present invention.

In the honeycomb catalyst of the embodiment of the present invention, the CHA zeolite is preferably ion-exchanged with Cu ions. In this case, the honeycomb unit contains Cu in an amount of preferably 3.5 to 6.0% by mass and more preferably 4.0 to 5.5% by mass relative to the amount of the zeolite. Since the Cu content is high, the NOx converting performance is high.

In the honeycomb catalyst of the embodiment of the present invention, the honeycomb unit contains the CHA zeolite in an amount of preferably 150 to 320 g/L and more preferably 180 to 300 g/L based on the apparent volume of the honeycomb unit.

In the honeycomb catalyst of the embodiment of the present invention, the inorganic binder contained in the honeycomb unit is not particularly limited, and preferable examples thereof include solid contents of alumina sol, silica sol, titania sol, water glass, sepiolite, attapulgite, and boehmite from the standpoint of maintaining the strength as a honeycomb catalyst. Two or more of these may be used in combination.

The amount of the inorganic binder in the honeycomb unit is preferably 3 to 20 vol % and more preferably 5 to 15 vol %. If the amount of the inorganic binder is less than 3 vol %, the strength of the honeycomb unit is lowered.

If the amount of the inorganic binder is more than 20 vol %, the zeolite content in the honeycomb unit is reduced, lowering the NOx converting performance.

In the honeycomb catalyst of the embodiment of the present invention, the honeycomb unit may further contain inorganic particles for adjusting the pore size of the honeycomb unit.

The inorganic particles contained in the honeycomb unit are not particularly limited, and examples thereof include particles made of alumina, titania, zirconia, silica, ceria, and magnesia. Two or more of these may be used in combination. The inorganic particles are preferably particles of at least one selected from the group consisting of alumina, titania, and zirconia, and more preferably particles of one selected from the group consisting of alumina, titania, and zirconia.

The inorganic particles have an average particle size of preferably 0.01 to 1.0 µm and more preferably 0.03 to 0.5 µm. When the inorganic particles have an average particle size of 0.01 to 1.0 µm, the pore size of the honeycomb unit can be adjusted.

The average particle size of the inorganic particles is a particle size (Dv50) corresponding to a 50% integral value in the grain size distribution (in volume base) determined by a laser diffraction/scattering method.

The amount of the inorganic particles in the honeycomb unit is preferably 10 to 40 vol % and more preferably 15 to 35 vol %. If the amount of the inorganic particles is less than 10 vol %, the addition of inorganic particles gives only a small effect of lowering the absolute value of the linear expansion coefficient of the honeycomb unit and the honeycomb unit tends to be damaged by a thermal stress. If the amount of the inorganic particles is more than 40 vol %, the amount of the CHA zeolite is reduced, lowering the NOx converting performance.

The CHA zeolite and the inorganic particles have a volume ratio (CHA zeolite:inorganic particles) of preferably 50:50 to 90:10 and more preferably 60:40 to 80:20. With the volume ratio of the CHA zeolite and the inorganic particles within the above range, the pore size of the honeycomb unit can be adjusted while the NOx converting performance is maintained.

In the honeycomb catalyst of the embodiment of the present invention, preferably, the honeycomb unit further contains at least one selected from the group consisting of inorganic fibers and scale-like materials for the purpose of enhancing the strength.

The inorganic fibers contained in the honeycomb unit are preferably made of at least one selected from the group consisting of alumina, silica, silicon carbide, silica alumina, glass, potassium titanate, and aluminum borate. The scale-like materials contained in the honeycomb unit are preferably made of at least one selected from the group consisting of glass, white mica, alumina, and silica. All of these materials have high heat resistance and, when used as catalyst carriers in the SCR system, are less likely to have erosion so as to maintain the effect as reinforcing materials.

The amount of the inorganic fibers and the scale-like materials in the honeycomb unit is preferably 3 to 30 vol %, and more preferably 5 to 20 vol %. If the amount is less than 3 vol %, the effect of improving the strength of the honeycomb unit is lowered. If the amount is more than 30 vol %, the zeolite content in the honeycomb unit is reduced, lowering the NOx converting performance.

In the honeycomb catalyst of the embodiment of the present invention, the cross section orthogonal to the longitudinal direction of the honeycomb unit preferably has an aperture ratio of 50 to 75%. If the aperture ratio of the cross section orthogonal to the longitudinal direction of the honeycomb unit is less than 50%, the zeolite is not effectively used in conversion of NOx. If the aperture ratio of the cross section orthogonal to the longitudinal direction of the honeycomb unit is more than 75%, the strength of the honeycomb unit is insufficient.

In the honeycomb catalyst of the embodiment of the present invention, the cross section orthogonal to the longitudinal direction of the honeycomb unit preferably has a through-hole density of 31 to 155 pcs/cm$^2$. If the through-hole density of the cross section orthogonal to the longitudinal direction of the honeycomb unit is less than 31 pcs/cm$^2$, the zeolite and exhaust gases are less likely to contact each other, lowering the NOx converting performance. If the through-hole density of the cross section orthogonal to the longitudinal direction of the honeycomb unit is more than 155 pcs/cm$^2$, the pressure loss of the honeycomb catalyst increases.

In the honeycomb catalyst of the embodiment of the present invention, the partition walls of the honeycomb unit have a thickness of preferably 0.1 to 0.4 mm, and more preferably 0.1 to 0.3 mm. If the partition wall of the honeycomb unit has a thickness of less than 0.1 mm, the strength of the honeycomb unit is lowered. If the partition wall of the honeycomb unit has a thickness of more than 0.4 mm, exhaust gases are less likely to permeate inside the partition walls of the honeycomb unit, so that the zeolite is not effectively used in conversion of NOx.

In the honeycomb catalyst of the embodiment of the present invention, when a peripheral coat layer is formed on the honeycomb unit, the peripheral coat layer preferably has a thickness of 0.1 to 2.0 mm. If the peripheral coat layer has a thickness of less than 0.1 mm, the effect of improving the strength of the honeycomb catalyst is insufficient. If the peripheral coat layer has a thickness of more than 2.0 mm, the zeolite content per unit volume of the honeycomb catalyst is reduced, lowering the NOx converting performance.

The shape of the honeycomb catalyst of the embodiment of the present invention is not limited to a round pillar shape and may be a rectangular pillar shape, a cylindroid shape, a pillar shape with a racetrack end face, or a round-chamfered polygonal pillar shape (e.g., round-chamfered triangular pillar shape).

In the honeycomb catalyst of the embodiment of the present invention, the shape of the through holes is not limited to a rectangular pillar shape, but may be a triangular pillar shape or a hexagonal pillar shape.

Next, a description is given on one example of a method for manufacturing a honeycomb catalyst 10 illustrated in FIG. 1.

First, a raw material paste is prepared which contains zeolite, an inorganic binder, and if necessary, inorganic particles and at least one selected from the group consisting of inorganic fibers and scale-like materials. The raw material paste is extrusion-molded to provide a round pillar-shaped honeycomb molded body including a plurality of through holes longitudinally formed in parallel with one another and a partition wall separating the through holes.

The inorganic binder contained in the raw material paste is not particularly limited, and examples thereof include alumina sol, silica sol, titania sol, water glass, sepiolite, attapulgite, and boehmite. Two or more of these may be used in combination.

The raw material paste may optionally contain an organic binder, a dispersing medium, a forming auxiliary, and the like.

The organic binder is not particularly limited, and examples thereof include methyl cellulose, carboxy methyl cellulose, hydroxyethyl cellulose, polyethylene glycol, phenolic resins, and epoxy resins. Two or more of these may be used in combination. The amount of the organic binder is preferably 1 to 10% relative to the total amount of the zeolite, inorganic particles, inorganic binder, inorganic fibers, and scale-like materials.

The dispersing medium is not particularly limited, and examples thereof include water, organic solvents (e.g., benzene) and alcohols (e.g., methanol). Two or more of these may be used in combination.

The forming auxiliary is not particularly limited, and examples thereof include ethylene glycol, dextrin, fatty acid, fatty acid soap, and polyalcohol. Two or more of these may be used in combination.

The raw material paste may optionally contain a pore-forming material.

The pore-forming material is not particularly limited, and examples thereof include polystyrene particles, acrylic particles and starch. Two or more of these may be used in combination. Among these, preferred are polystyrene particles.

Controlling the particle size of the CHA zeolite and the pore-forming material enables control of the pore size distribution of the partition wall within a predetermined range.

Even in a case where a pore-forming material is not added, controlling the particle sizes of the CHA zeolite and the inorganic particles enables control of the pore size distribution of the partition wall within a predetermined range.

When the raw material paste is prepared, the respective components are preferably mixed or kneaded, and they may be mixed using a mixer or attritor or kneaded with a kneader.

Next, the honeycomb molded body is dried using a dryer (e.g., microwave dryer, hot air dryer, dielectric dryer, decompression dryer, vacuum dryer, freeze dryer) to provide a honeycomb dried body.

The honeycomb dried body is degreased to provide a honeycomb degreased body. The degreasing condition may be appropriately determined in accordance with the kind and amount of the organic substance contained in the honeycomb dried body, and is preferably 200 to 500° C. for 2 to 6 hours.

Next, the honeycomb degreased body is fired to provide a round pillar-shaped honeycomb unit 11. The firing temperature is preferably 600 to 1000° C. and more preferably 600 to 800° C. If the firing temperature is lower than 600° C., the sintering does not proceed well, resulting in poor strength of the honeycomb unit 11. If the firing temperature is higher than 1000° C., the sintering proceeds too much, reducing the reaction sites of the zeolite.

Next, a peripheral coat layer paste is applied to the peripheral surfaces, except for the both end faces, of the round pillar-shaped honeycomb unit 11.

The peripheral coat layer paste is not particularly limited, and examples thereof include a mixture of an inorganic binder and inorganic particles, a mixture of an inorganic binder and inorganic fibers, and a mixture of an inorganic binder, inorganic particles, and inorganic fibers.

The inorganic binder contained in the peripheral coat layer paste is not particularly limited, and may be added in the form of a silica sol or an alumina sol. Two or more of the inorganic binders may be used in combination. In particular, the inorganic binder is preferably added in the form of a silica sol.

The inorganic particles contained in the peripheral coat layer paste are not particularly limited, and examples thereof include oxide particles made of zeolite, eucryptite, alumina, silica, or the like; carbide particles made of silicon carbide or the like; and nitride particles made of silicon nitride, boron nitride, or the like. Two or more of these may be used in combination. In particular, preferred are eucryptite particles, which have a thermal expansion coefficient similar to that of the honeycomb unit.

The inorganic fibers contained in the peripheral coat layer paste are not particularly limited, and examples thereof include silica alumina fibers, mullite fibers, alumina fibers, and silica fibers. Two or more of these may be used in combination. In particular, preferred are alumina fibers.

The peripheral coat layer paste may further contain an organic binder.

The organic binder contained in the peripheral coat layer paste is not particularly limited, and examples thereof include polyvinyl alcohol, methyl cellulose, ethyl cellulose, and carboxy methyl cellulose. Two or more of these may be used in combination.

The peripheral coat layer paste may further contain balloons that are fine hollow spheres of an oxide ceramic, a pore-forming material, and the like.

The balloons contained in the peripheral coat layer paste are not particularly limited, and examples thereof include alumina balloons, glass microballoons, sirasu balloons, fly ash balloons, and mullite balloons. Two or more of these may be used in combination. Among these, preferred are alumina balloons.

The pore-forming material contained in the peripheral coat layer paste is not particularly limited, and examples thereof include spherical acrylic particles and graphite. Two or more of these may be used in combination.

Next, the honeycomb unit 11 with the peripheral coat layer paste applied thereto is dried so that the paste is solidified, thereby providing the round pillar-shaped honeycomb catalyst 10. In a case where the peripheral coat layer paste contains an organic binder, degreasing is preferably performed. The degreasing condition may be appropriately determined in accordance with the kind and amount of the organic material, and is preferably 500° C. for one hour.

The exhaust gas purifying apparatus of the embodiment of the present invention includes the above-described honeycomb catalyst.

Figure 2:
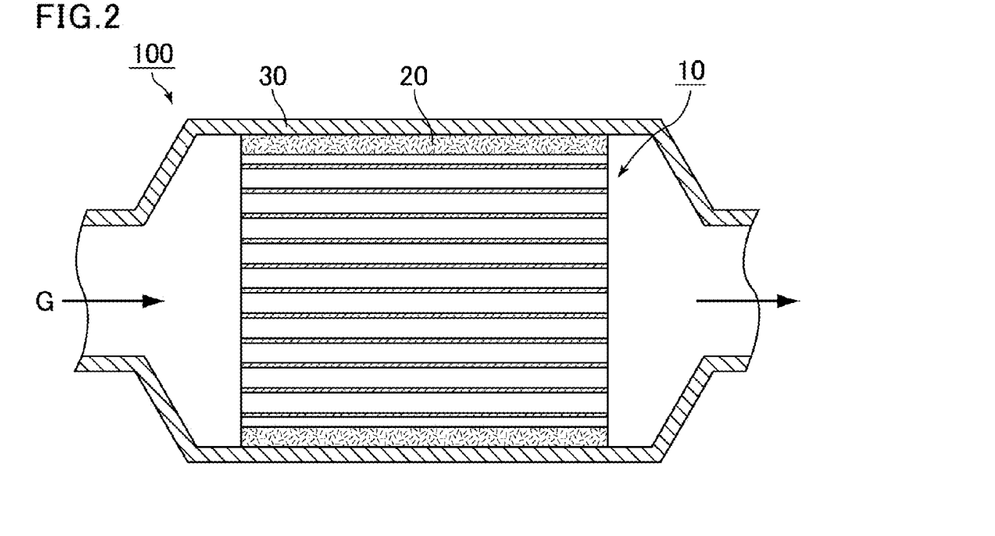
FIG. 2 is a cross-sectional view schematically illustrating one example of an exhaust gas purifying apparatus of an embodiment of the present invention.

FIG. 2 shows one example of an exhaust gas purifying apparatus of the embodiment of the present invention. An exhaust gas purifying apparatus 100 illustrated in FIG. 2 can be manufactured by canning the honeycomb catalyst 10 and a holding sealing material 20 arranged on the peripheral portion of the honeycomb catalyst 10 in a metallic container (shell) 30. In the exhaust gas purifying apparatus 100, a spraying means (not illustrated), such as a spraying nozzle, for spraying ammonia or a compound to be decomposed to generate ammonia is provided inside a piping (not illustrated) at an upstream side of the honeycomb catalyst 10 relative to the flow direction of exhaust gases (in FIG. 2, exhaust gases are indicated by G and the flow direction thereof is indicated by arrows). With this configuration, since ammonia is added to the exhaust gases flowing inside the piping, the zeolite contained in the honeycomb unit 11 reduces NOx in the exhaust gases.

The compound to be decomposed to generate ammonia is not particularly limited as long as it is hydrolized inside the piping to generate ammonia. Preferred is urea water as it is excellent in storage stability.

The urea water is heated by exhaust gases inside the piping to be hydrolized, thereby generating ammonia. Since the zeolite of the embodiment of the present invention contains K in a small amount of 0.1 to 1% by mass in terms of $K_2O$, ammonia to be used for reduction of NOx is less likely to be oxidized to be sufficiently present. Especially, even in a high temperature range (around 525° C.) of exhaust gases, ammonia is sufficiently present.

Figure 3:
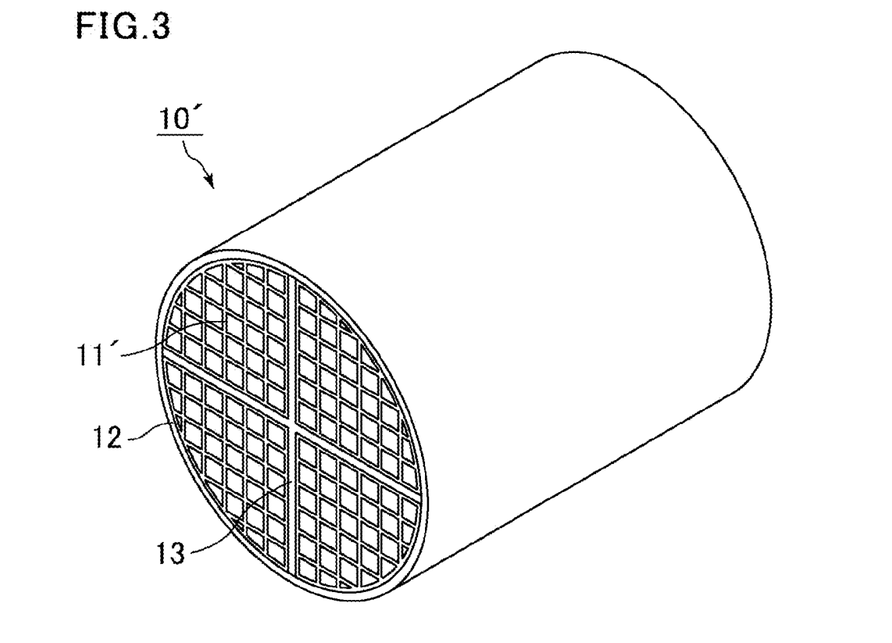
FIG. 3 is a perspective view schematically illustrating another example of the honeycomb catalyst of an embodiment of the present invention.

FIG. 3 shows another example of the honeycomb catalyst of the embodiment of the present invention. A honeycomb catalyst 10' illustrated in FIG. 3 has the same configuration as the honeycomb catalyst 10, except that a plurality of honeycomb units 11' (see FIG. 4) including a plurality of through holes 11a longitudinally formed in parallel with one another and a partition wall 11b separating the through holes are bonded through an adhesive layer 13.

Figure 4:
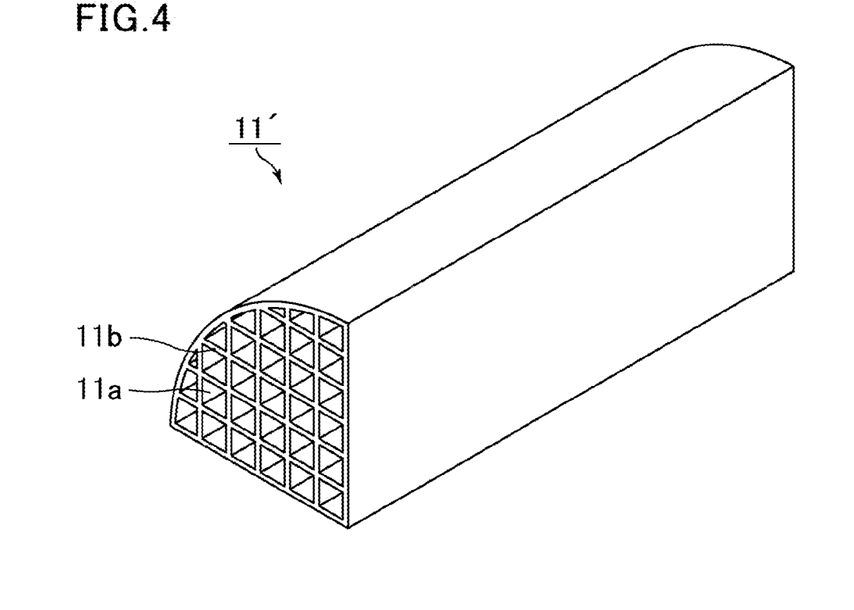
FIG. 4 is a perspective view schematically illustrating one example of a honeycomb unit included in another honeycomb catalyst of an embodiment of the present invention.

The cross section orthogonal to the longitudinal direction of the honeycomb unit 11' preferably has an area of 10 to 200 cm². If the cross-sectional area is less than 10 cm², the honeycomb catalyst 10' has a greater pressure loss. If the cross-sectional area is more than 200 cm², the honeycomb units 11' are hardly bonded to one another.

The honeycomb unit 11' has the same configuration as the honeycomb unit 11, except for the area of the cross section orthogonal to the longitudinal direction.

The adhesive layer 13 preferably has a thickness of 0.1 to 3.0 mm. If the adhesive layer 13 has a thickness of less than 0.1 mm, the bonding strength of the honeycomb units 11' is insufficient. If the adhesive layer 13 has a thickness of more than 3.0 mm, the honeycomb catalyst 10' may have a greater pressure loss or cracks may occur in the adhesive layer.

Next, a description is given on one example of the method for manufacturing the honeycomb catalyst 10' illustrated in FIG. 3.

First, sectorial pillar-shaped honeycomb units 11' are manufactured in the same manner as in the case of the honeycomb unit 11 included in the honeycomb catalyst 10. Next, an adhesive layer paste is applied to the peripheral surfaces of the honeycomb units 11', except for the surfaces on the arc side, and the honeycomb units 11' are bonded. The honeycomb units 11' are dried so that the paste is solidified, thereby providing an aggregated body of the honeycomb units 11'.

The adhesive layer paste is not particularly limited, and examples thereof include a mixture of an inorganic binder and inorganic particles, a mixture of an inorganic binder and inorganic fibers, and a mixture of an inorganic binder, inorganic particles, and inorganic fibers.

The inorganic binder contained in the adhesive layer paste is not particularly limited, and may be added in the form of a silica sol or an alumina sol. Two or more of the inorganic binders may be used in combination. In particular, the inorganic binder is preferably added in the form of a silica sol.

The inorganic particles contained in the adhesive layer paste are not particularly limited, and examples thereof include oxide particles made of zeolite, eucryptite, alumina, silica, or the like; carbide particles made of silicon carbide or the like; and nitride particles made of silicon nitride, boron nitride, or the like. Two or more of these may be used in combination. In particular, preferred are eucryptite particles as they have a thermal expansion coefficient similar to that of the honeycomb unit.

The inorganic fibers contained in the adhesive layer paste are not particularly limited, and examples thereof include silica alumina fibers, mullite fibers, alumina fibers, and silica fibers. Two or more of these may be used in combination. In particular, preferred are alumina fibers.

The adhesive layer paste may further contain an organic binder.

The organic binder contained in the adhesive layer paste is not particularly limited, and examples thereof include polyvinyl alcohol, methyl cellulose, ethyl cellulose, and carboxy methyl cellulose. Two or more of these may be used in combination.

The adhesive layer paste may further contain balloons that are fine hollow spheres of oxide ceramic, and a pore-forming material.

The balloons contained in the adhesive layer paste are not particularly limited, and examples thereof include alumina balloons, glass microballoons, sirasu balloons, fly ash balloons, and mullite balloons. Two or more of these may be used in combination. In particular, preferred are alumina balloons.

The pore-forming material contained in the adhesive layer paste is not particularly limited, and examples thereof include spherical acrylic particles and graphite. Two or more of these may be used in combination.

For the purpose of enhancing the circularity, the aggregated body of the honeycomb units 11' is optionally cut and ground, thereby providing a round pillar-shaped aggregated body of the honeycomb units 11'.

Next, a peripheral coat layer paste is applied to the peripheral faces, except for both end faces, of the round pillar-shaped aggregated body of the honeycomb units 11'.

The peripheral coat layer paste may be the same as or different from the adhesive layer paste.

Next, the round pillar-shaped aggregated body of the honeycomb units 11' with the peripheral coat layer paste applied thereto is dried so that the paste is solidified, thereby providing the round pillar-shaped honeycomb catalyst 10'. At this time, in a case where the adhesive layer paste and/or the peripheral coat layer paste contains an organic binder, degreasing is preferably performed. The degreasing condition may be appropriately determined in accordance with the kind and the amount of the organic substance, and is preferably 500° C. for one hour.

Here, the honeycomb catalyst 10' includes four pieces of the honeycomb units 11' bonded to one another with the adhesive layer 13 therebetween. It is to be noted that the number of honeycomb units included in a honeycomb catalyst is not particularly limited. For example, 16 pieces of rectangular pillar-shaped honeycomb units may be bonded to one another with an adhesive layer therebetween to form a round pillar-shaped honeycomb catalyst.

The honeycomb catalysts 10 and 10' may not have the peripheral coat layer 12.

As described above, in the honeycomb catalyst of the embodiment of the present invention, formation of a honeycomb unit using a CHA zeolite as a zeolite can improve the NOx converting performance. Moreover, setting the $SiO_2/Al_2O_3$ composition ratio to less than 15 and the amount of K in terms of $K_2O$ contained in the zeolite to 0.1 to 1% by mass can suppress oxidation of ammonia when the resulting exhaust purifying apparatus is used at high temperatures.

EXAMPLES

Examples more specifically describing the embodiment of the present invention are given in the following. It is to be noted that the present invention is not limited only to these examples.

Example 1

A raw material composition was prepared by mixing colloidal silica (manufactured by NISSAN CHEMICAL INDUSTRIES, LTD., SNOWTEX) as a Si source, a dried aluminum hydroxide gel (manufactured by Tomita Pharmaceutical Co., Ltd.) as an Al source, sodium hydroxide (manufactured by Tokuyama Corporation) and potassium hydroxide (manufactured by TOAGOSEI CO., LTD.) as alkali sources, a 25% aqueous solution of N,N,N-trimethyl adamantane ammonium hydroxide (TMAAOH) (manufactured by Sachem) as a structure directing agent (SDA), SSZ-13 as a seed crystal, and deionized water. The raw material composition had a molar ratio of $SiO_2$: 15 mol, $Al_2O_3$: 1 mol, NaOH: 2.6 mol, KOH: 0.9 mol, TMAAOH: 1.1 mol, and $H_2O$: 300 mol. To the $SiO_2$ and $Al_2O_3$ in the raw material composition, 5.0% by mass of the seed crystal was added. The raw material composition was charged into a 500-L autoclave and subjected to hydrothermal synthesis at a heating temperature of 180° C. for a heating time of 24 hours, thereby synthesizing a zeolite.

Next, 1 mol of ammonium sulfate was dissolved in 1 L of water. Then, the zeolite was added to the solution in an amount of 1 g relative to 4 g of the solution, and stirred for one hour to control the amount of K in the zeolite.

Next, the synthesized zeolite, after controlling the amount of K contained therein, was subjected to ion exchange with an aqueous copper acetate (II) solution having a copper concentration of 2.34% by mass for the first ion exchange, and with an aqueous copper acetate (II) solution having a copper concentration of 0.59% by mass for the second ion exchange at a solution temperature of 50° C. under atmospheric pressure for one hour, thereby supporting 4.6% by mass of copper on the zeolite. Table 1 shows the compounding' ratio (molar ratio) of the raw material composition and synthesis conditions.

Example 2

The zeolite was synthesized in the same manner as in Example 1, except that the compounding ratio (molar ratio) of the raw material composition and the synthesis conditions were set as shown in Table 1.

Comparative Example 1

The zeolite was synthesized in the same manner as in Example 1, except that the compounding ratio (molar ratio) of the raw material composition and the synthesis conditions were set as shown in Table 1. In Comparative Example 1, potassium hydroxide was not used in the raw material composition.

Comparative Example 2

The zeolite was similarly prepared as in Example 2, except that the amount of K in the synthesized zeolite was not controlled. The compounding ratio (molar ratio) of the raw material composition and the synthesis conditions were set as shown in Table 1.

TABLE 1

|  | Compounding ratio (molar ratio) | | | | | | Synthesis condition | | |
|---|---|---|---|---|---|---|---|---|---|
|  | | | | | | | Temperature | Time | Autoclave capacity |
|  | $SiO_2$ | $Al_2O_3$ | NaOH | KOH | $H_2O$ | TMAAOH | [° C.] | [hr] | [L] |
| Example 1 | 15 | 1 | 2.6 | 0.9 | 300 | 1.1 | 180 | 24 | 500 |
| Example 2 | 15 | 1 | 1.6 | 0.5 | 209 | 1.6 | 160 | 24 | 10 |
| Comprative Example 1 | 15 | 1 | 3.4 | — | 510 | 1.1 | 180 | 24 | 10 |
| Comparative Example 2 | 15 | 1 | 1.6 | 0.5 | 209 | 1.6 | 160 | 24 | 10 |

[Moisture Control of Powder for Zeolite Crystal Structure Analysis]

To each of the zeolite powders synthesized in Examples 1 to 2 and Comparative Examples 1 and 2 (based on the weight after drying at 200° C. in the air for one hour or longer), 15% by mass of lithium fluoride was added and mixed in an agate mortar for 30 minutes. The mixed powder was charged in a folder for XRD measurement. Next, a saturated ammonium sulfate aqueous solution was prepared at a room temperature and allowed to stand still in a sealed container. At this time, the prepared amount of the saturated ammonium sulfate aqueous solution was excessive relative to the volume of the sealed container to the degree that the solution was not totally evaporated. When the humidity in the sealed container was confirmed to be stable, the folder for XRD measurement containing the powder was placed in the sealed container and the powder was allowed to absorb moisture for 7 hours. After moisture absorption, the surface of the folder was covered with a parafilm for avoiding contact with air, thereby controlling the moisture content.

[Analysis of Crystal Structure of Zeolite]

With an X-ray diffractometer (manufactured by Rigaku Corporation, Ultima IV), thus prepared powder for crystal structure analysis containing the zeolite synthesized in Example 1 was subjected to XRD measurement. The measurement conditions were set to radiation source: CuKα ($\lambda$=0.154 nm), measurement method: FT method, diffraction angle: 2θ=5 to 48°, step width: 0.02°, integration time: 1 second, divergence slit and scattering slit: 2/3°, longitudinal restriction divergence slit: 10 mm, accelerating voltage: 40 kV, and acceleration current: 40 mA. The weight of the powder for crystal structure analysis was checked before and after the measurement, and the weight change was confirmed to be not more than 0.05% by mass.

Figure 5:
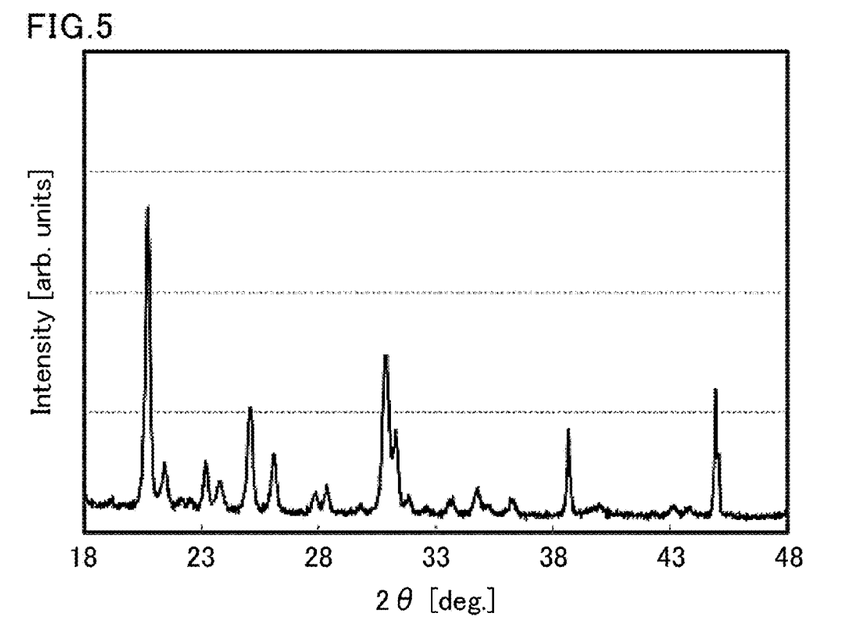
FIG. 5 is a chart showing an XRD pattern of a zeolite synthesized in Example 1.
Figure 6:
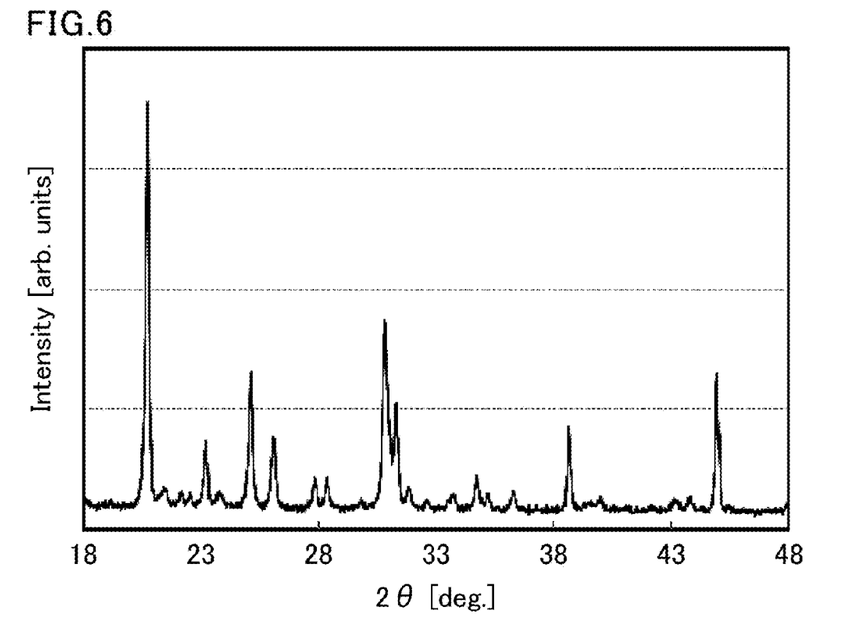
FIG. 6 is a chart showing an XRD pattern of a zeolite synthesized in Example 2.
Figure 7:
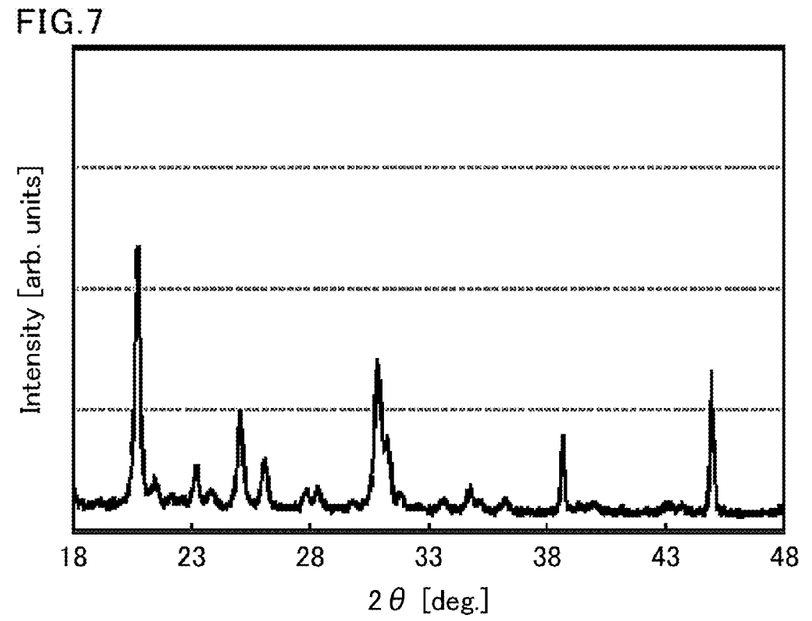
FIG. 7 is a chart showing an XRD pattern of a zeolite synthesized in Comparative Example 1.
Figure 8:
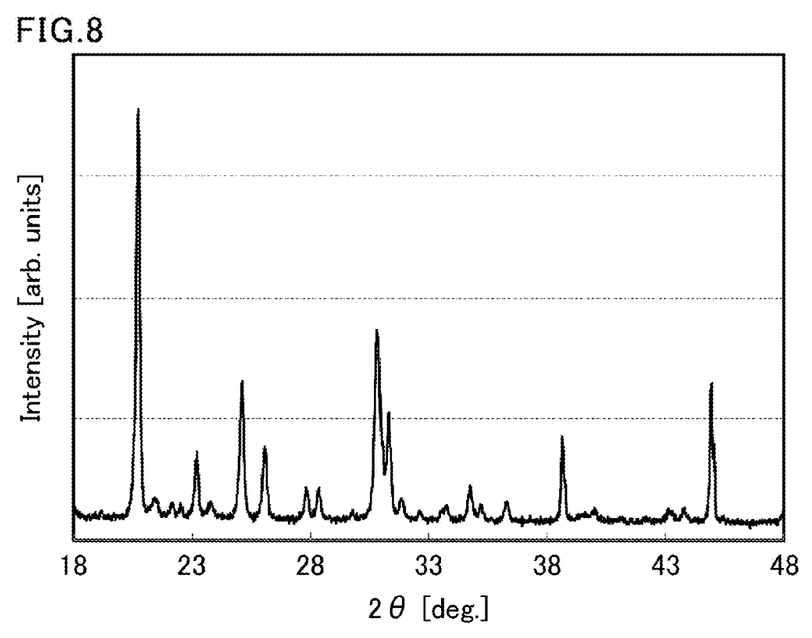
FIG. 8 is a chart showing an XRD pattern of a zeolite synthesized in Comparative Example 2.

FIGS. 5 to 8 show XRD patterns of the zeolites synthesized in Examples 1 and 2 and Comparative Examples 1 and 2. FIG. 5 shows the XRD pattern of Example 1. FIG. 6 shows the XRD pattern of Example 2. FIG. 7 shows the XRD pattern of Comparative Example 1. FIG. 8 shows the XRD pattern of Comparative Example 2.

From FIGS. 5 to 8, all the zeolites synthesized in Examples 1 and 2 and Comparative Examples 1 and 2 had a CHA structure.

The resulting XRD data was subjected to peak search with use of JADE 6.0 (powder X-ray diffraction pattern integrated analysis software). The conditions for peak search were set to filter type: parabola filter, Kα2 peak: eliminated, peak position: peak top, threshold value σ: 3, peak intensity % cut-off: 0.1, range for determining BG: 1, and the number of points for averaging BG: 7. In the case of the zeolite of Example 1, the half-value width of the (101) plane was 0.202, the integrated intensities of the (211) plane, (104) plane, and (220) plane were respectively 33174, 11752, and 6435. The sum thereof was 51361. The integrated intensities of the (111) plane and (200) plane of lithium fluoride were respectively 5231 and 9104. The sum thereof was 14335. The ratio (X-ray integrated intensity ratio) between the sum of the integrated intensities (i.e., the total integrated intensity of a (211) plane, a (104) plane, and a (220) plane) of the zeolite in Example 1 and the sum of the integrated intensities (i.e., the total integrated intensity of a (111) plane, and a (200) plane) of lithium fluoride was 3.58.

The X-ray integrated intensity ratios of the zeolites synthesized in Example 2 and Comparative Examples 1 and 2 were similarly determined. Table 2 shows the results.

[Measurement of Particle Size of Zeolite]

With a scanning electron microscope (SEM, manufactured by Hitachi High-Technologies Corporation, S-4800), SEM photographs of the zeolites synthesized in Examples 1 and 2, and Comparative Examples 1 and 2 were taken. Using these photographs, the particle sizes of the zeolites were measured. The measurement conditions were set to accelerating voltage: 1 kV, emission: 10 µA, and WD: 2.2 mm or less. The measuring magnification was set to 50000 times in Example 1 (about 0.2 µm), and 5000 times in Example 2 (about 1.0 µm). The particle size was determined as the average particle size of ten particles measured based on two diagonal lines thereof. Table 2 shows the results.

Figure 9:
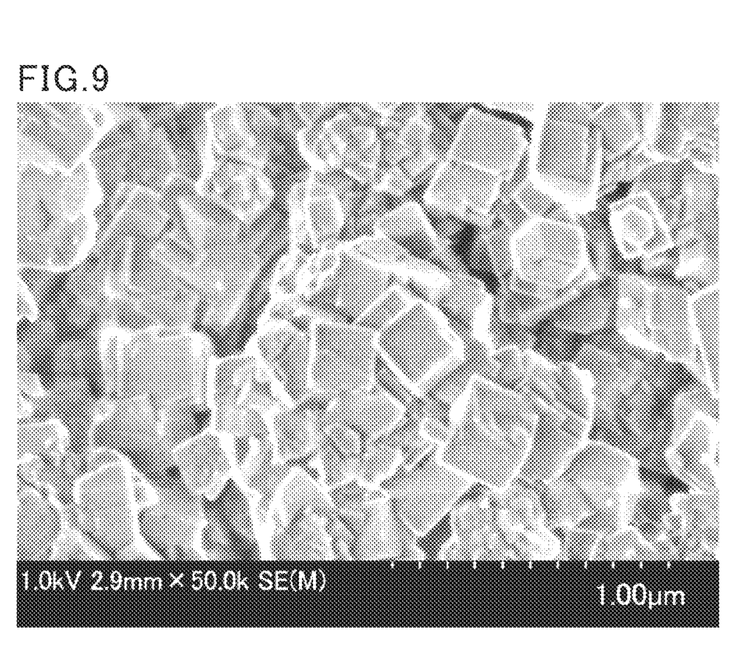
FIG. 9 is a SEM photograph showing zeolite particles synthesized in Example 1.
Figure 10:
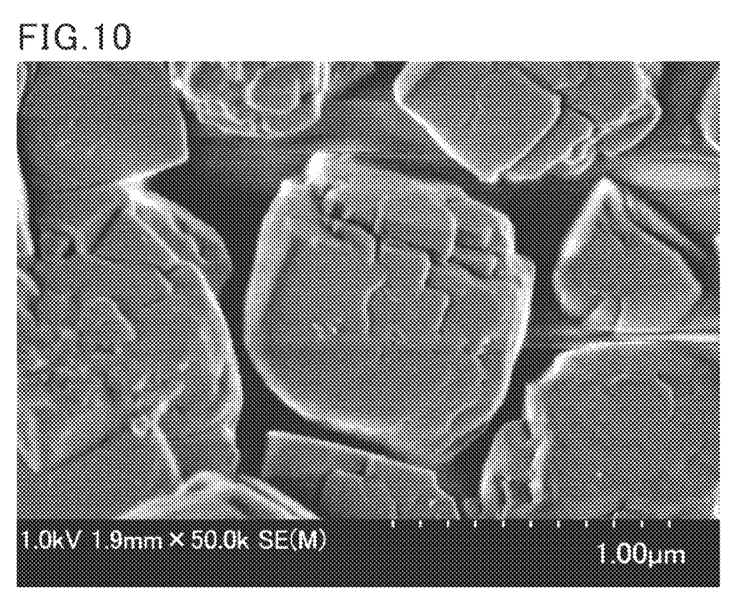
FIG. 10 is a SEM photograph showing zeolite particles synthesized in Example 2.

FIG. 9 is a SEM photograph of the zeolite synthesized in Example 1. FIG. 10 is a SEM photograph of the zeolite synthesized in Example 2.

[Measurement of Molar Ratio (SAR, $SiO_2/Al_2O_3$) of Zeolite]

With a fluorescence X-ray analyzer, (XRF, manufactured by Rigaku Corporation, ZSX Primus2), the molar ratios (SAR, $SiO_2/Al_2O_3$) of the zeolites synthesized in Examples 1 and 2 and Comparative Examples 1 and 2 were measured. The measurement conditions were set to X-ray tube: Rh, rated maximum output: 4 kW, element range of detection: F to U, quantification method: SQX method, and analyzing range: 10 mmφ. Table 2 shows the results.

[Measurement of Amount of Supported Cu]

With a fluorescence X-ray analyzer (XRF, manufactured by Rigaku Corporation, ZSX Primus 2), the amounts of Cu supported on the zeolites synthesized in Examples 1 and 2 and Comparative Examples 1 and 2 were measured. The measurement conditions were set to X-ray tube: Rh, rated maximum output: 4 kW, element range of detection: F to U, quantification method: SQX method, and analyzing range: 10 mmφ. Table 2 shows the results.

[Measurement of K Content]

With a fluorescence X-ray analyzer (XRF, manufactured by Rigaku Corporation, ZSX Primus2), the amounts of K contained in the zeolites synthesized in Examples 1 and 2 and Comparative Examples 1 and 2 were measured.

The measurement conditions were set to X-ray tube: Rh, rated maximum output: 4 kW, element range of detection: F to U, quantification method: SQX method, and analyzing range: 10 mmφ. Table 2 shows the results.

[Manufacturing of Honeycomb Catalyst]

A raw material paste was prepared by mixing the zeolite (40% by mass) obtained in each of Examples 1 and 2 and Comparative Examples 1 and 2, pseudo-boehmite (8% by mass) as an inorganic binder, glass fibers having an average fiber length of 100 µm (7% by mass), methyl cellulose (6.5% by mass), a surfactant (3.5% by mass), and ion exchange water (35% by mass). The used zeolite was preliminary ion-exchanged with copper ions.

The raw material paste was extrusion-molded by an extrusion molding machine to provide a honeycomb molded body. The honeycomb molded body was dried by a reduced-pressure microwave dryer with an output of 4.5 kW at a reduced pressure of 6.7 kPa for 7 minutes, and then degreased by firing at an oxygen concentration of 1% at 700° C. for 5 hours, thereby providing a honeycomb catalyst (honeycomb unit). The honeycomb unit had a right rectangular pillar-shape having a side of 35 mm and a length of 150 mm. In the honeycomb unit, the through-hole density was 124 pcs/cm² and the thickness of the partition wall was 0.20 mm.

[Measurement of NOx Conversion Rate]

Round pillar-shaped test samples having a diameter of 25.4 mm and a length of 38.1 mm were cut out from the prepared honeycomb units with a diamond cutter. Through the samples, imitation gases at 200° C. were flowed at a space velocity (SV) of 40000/hr. With a catalyst analyzer (manufactured by HORIBA Ltd., SIGU-2000/MEXA-6000FT), the amount of NOx flowing out of the test samples was measured. The NOx conversion rate (%) represented by the formula (1) was calculated:

$$\{(\text{Flow-in amount of NO}x) - (\text{Flow-out amount of NO}x)\}/(\text{Flow-in amount of NO}x) \times 100 \qquad (1).$$

The imitation gases contained 262.5 ppm of nitrogen monoxide, 87.5 ppm of nitrogen dioxide, 350 ppm of ammonia, 10% of oxygen, 5% of carbon dioxide, 5% of water, and nitrogen (balance).

Similarly, the conversion rate [%] of NOx was calculated while imitation gases at 525° C. were flowed at SV of 100000/hr. The imitation gases contained 315 ppm of nitrogen monoxide, 35 ppm of nitrogen dioxide, 385 ppm of ammonia, 10% of oxygen, 5% of carbon dioxide, 5% of water, and nitrogen (balance). Table 2 shows the conversion rates of NOx of the honeycomb catalysts manufactured using the zeolites obtained in Examples 1 and 2 and Comparative Examples 1 and 2.

[Measurement of Displacement Caused by Water Absorption]

A right rectangular pillar-shaped test sample having a side of 35 mm and a length of 10 mm was cut out from the honeycomb unit with a diamond cutter. The test sample was dried in a drying apparatus at 200° C. for 2 hours. Then, with a measuring microscope (manufactured by Nikon, Measuring Microscope MM-40 of 100 magnifications), the distance between the absolutely dried outermost walls (distance between one outermost wall and another outermost wall on the other side of the honeycomb of the test sample) was measured. The measurement site was the center portion of the peripheral side in the longitudinal direction of the sample. The measurement was performed only on one side of the sample. Next, the test sample was immersed in water for one hour, and water on the sample surface was removed by air blowing. Then, the distance between the water-absorbing outermost walls was similarly measured. The displacement caused by water absorption was calculated by the formula (2):

{(Distance between absolutely dried outermost walls)−(Distance between water-absorbing outermost walls)}/(Distance between absolutely dried outermost walls)×100     (2).

Table 2 shows the displacements by water absorption of the honeycomb catalysts manufactured using the zeolites obtained in Examples 1 and 2 and Comparative Examples 1 and 2.

of K. For manufacturing the zeolite containing 0% of K, the $H_2O$ ratio needs to be increased by double, which leads to a high cost.

The zeolite obtained in Comparative Example 2, though having a molar ratio ($SiO_2/Al_2O_3$) of 13.1 and supporting Cu in a large amount of 5.5% by mass, contained K in a large amount of 1.8% in terms of $K_2O$, and therefore, the NOx conversion rate was not satisfactory. In particular, the NOx conversion rate at 525° C. was low as 78.2%.

In addition, since the zeolite obtained in Example 1 had a small particle size of 0.25 μm, the displacement caused by water absorption was small as 0.19%. As a result, cracks were not formed in the test sample of the honeycomb unit.

The zeolite of the embodiment of the present invention is a zeolite having a CHA structure, the zeolite having a $SiO_2/Al_2O_3$ composition ratio of less than 15, the zeolite containing K in an amount of 0.1 to 1% by mass in terms of $K_2O$. The method for manufacturing a zeolite of the embodiment of the present invention is a method including the step of: synthesizing the zeolite by reacting a raw material composition containing a Si source, an Al source, an alkali source, water, and a structure directing agent; and controlling the amount of K in the zeolite synthesized in the synthesis step using at least one of ammonium sulfate, ammonium nitrate, and ammonium chloride. The honeycomb catalyst of the embodiment of the present invention is a honeycomb catalyst including a honeycomb unit having a plurality of through holes longitudinally formed in parallel with one another and a partition wall separating the through holes, wherein the honeycomb unit contains a zeolite and an inorganic binder, and the zeolite is the above-mentioned zeolite. The exhaust gas purifying apparatus of the embodiment of the present invention includes the above-mentioned honeycomb catalyst.

These essential features are appropriately combined with various constitutions (e.g., X-ray integrated intensity ratio, amount of supported Cu, specific surface area, constitution of a Si source, constitution of a structure directing agent, condition of hydrothermal synthesis, constitution of a honeycomb unit, condition of firing of a honeycomb catalyst) described in the present description, thereby giving a desired effect.

TABLE 2

| | Physical properties of synthesized zeolite | | | | | Evaluation on honeycomb catalyst | | |
| --- | --- | --- | --- | --- | --- | --- | --- | --- |
| | X-ray integrated intensity ratio | $SiO_2/Al_2O_3$ [mol/mol] | Particle size [μm] | Cu [mass %] | Amount of K in terms of $K_2O$ (mass %) | Nox conversion rate [%] 200° C. | 525° C. | Displacement by water absorption [%] |
| Example 1 | 3.58 | 12.6 | 0.25 | 4.6 | 0.3 | 92.4 | 95.8 | 0.19 |
| Example 2 | 3.51 | 13.1 | 1.05 | 5.5 | 0.2 | 92.6 | 94.7 | 0.26 |
| Comparative Example 1 | 3.23 | 11.5 | 0.58 | 5.1 | 0.0 | 94.2 | 96.7 | — |
| Comparative Example 2 | 3.51 | 13.1 | 1.05 | 5.5 | 1.8 | 93.4 | 78.2 | 0.26 |

The zeolites obtained in Examples 1 and 2 had a molar ratio ($SiO_2/Al_2O_3$) of less than 15 and contained K in a significantly small amount of 0.3% (Example 1) and 0.2% (Example 2) in terms of $K_2O$. The honeycomb catalysts manufactured using these had a high NOx conversion rate of 92.4% (Example 1) and 92.6% (Example 2) at 200° C. and 95.8% (Example 1) and 94.7% (Example 2) at 525° C.

The zeolite obtained in Comparative Example 1 had a molar ratio ($SiO_2/Al_2O_3$) of less than 15 and contained 0%

Obviously, numerous modifications and variations of the present invention are possible in light of the above teachings. It is therefore to be understood that within the scope of the appended claims, the invention may be practiced otherwise than as specifically described herein.

The invention claimed is:

1. A zeolite comprising:
   a CHA structure;
   a $SiO_2/Al_2O_3$ composition ratio of 10 to 14.9;

potassium in an amount of about 0.1% by mass to about 1% by mass in terms of $K_2O$; and an average particle size of about 0.1 μm to 0.5 μm.

2. The zeolite according to claim 1, wherein the zeolite has a ratio of a total integrated intensity of a (211) plane, a (104) plane, and a (220) plane in an X-ray diffraction spectrum obtained by a powder X-ray diffraction method of about 3.1 or more relative to a total integrated intensity of a (111) plane and a (200) plane in an X-ray diffraction spectrum of lithium fluoride.

3. The zeolite according to claim 1, wherein the zeolite includes Cu in an amount of about 3.5% by mass to about 6.0% by mass.

4. The zeolite according to claim 2, wherein the zeolite includes Cu in an amount of about 3.5% by mass to about 6.0% by mass.

5. The zeolite according to claim 1, wherein the $SiO_2/Al_2O_3$ composition ratio is from 12.6 to 13.1.

6. A honeycomb catalyst comprising:

a honeycomb unit having partition walls extending along a longitudinal direction of the honeycomb unit to define through holes, the honeycomb unit comprising:

an inorganic binder; and a zeolite comprising:

a CHA structure, the honeycomb unit including the zeolite having the CHA structure in an amount of 150 to 320 g/L based on an apparent volume of the honeycomb unit;

a $SiO_2/Al_2O_3$ composition ratio less than 15;

potassium in an amount of about 0.1% by mass to about 1% by mass in terms of $K_2O$; and an average particle size of about 0.1 μm to 0.5 μm.

7. The honeycomb catalyst according to claim 6, wherein the honeycomb unit further contains inorganic particles, and the inorganic particles comprise at least one of alumina, titania, and zirconia.

8. The honeycomb catalyst according to claim 6, wherein the $SiO_2/Al_2O_3$ composition ratio is from 12.6 to 13.1.

9. An exhaust gas purifying apparatus comprising:

a honeycomb catalyst comprising:

a honeycomb unit having partition walls extending along a longitudinal direction of the honeycomb unit to define through holes, the honeycomb unit comprising:

an inorganic binder; and a zeolite comprising:

a CHA structure, the honeycomb unit including the zeolite having the CHA structure in an amount of 150 to 320 g/L based on an apparent volume of the honeycomb unit;

a $SiO_2/Al_2O_3$ composition ratio less than 15;

potassium in an amount of about 0.1% by mass to about 1% by mass in terms of $K_2O$;

an average particle size of about 0.1 μm to 0.5 μm.

10. The exhaust gas purifying apparatus according to claim 9, wherein the $SiO_2/Al_2O_3$ composition ratio is from 12.6 to 13.1.

* * * * *